MEASUREMENT OF ENVELOPE DELAY DISTORTION

Filed June 7, 1952

INVENTOR
J. B. MAGGIO
BY George C. Lord
ATTORNEY

United States Patent Office 2,767,373

Patented Oct. 16, 1956

2,767,373

MEASUREMENT OF ENVELOPE DELAY DISTORTION

John B. Maggio, Summit, N. J., assignor to Bell Telephone Laboratories, Incorporated, New York, N. Y., a corporation of New York Application June 7, 1952, Serial No. 292,345

7 Claims. (Cl. 324—57)

Figures 1, 2:
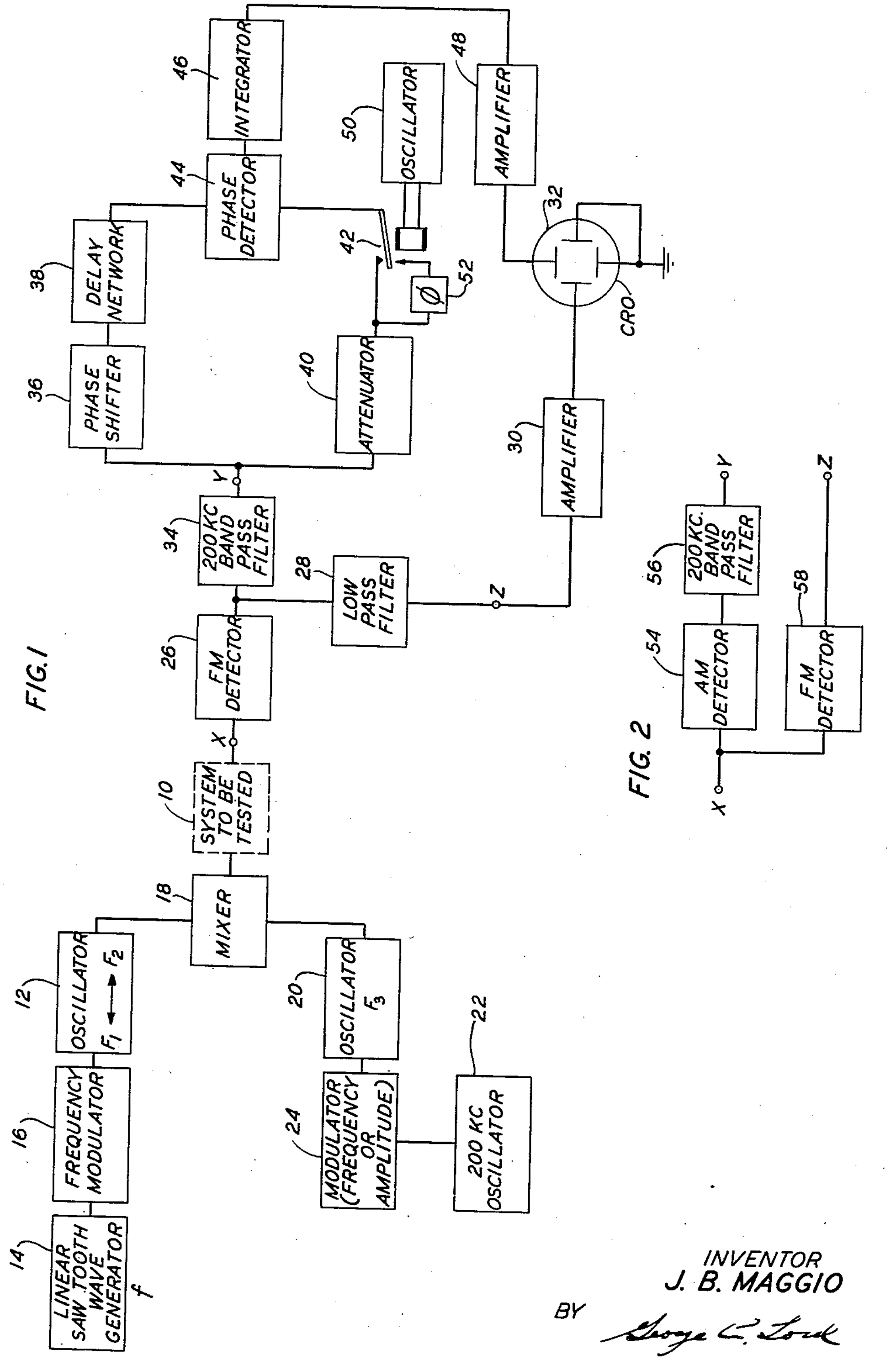

This invention relates to testing circuits and more particularly to circuits and methods for measuring the envelope delay distortion of transmission system.

The quantity known as envelope delay may be defined as the rate of change of phase with respect to frequency experienced in the transmission of a given band of frequencies over a circuit under investigation. Envelope delay distortion occurs as a result of variations in this quantity which corresponds to the slope of the phase versus frequency curve of the transmission system.

It has been found that most transmission systems and especially long-haul coaxial cable and radio relay systems present envelope delay distortion problems particularly when used for television, picture or multiplex telephone transmission. In all such systems there is of course an overall phase shift or delay caused by the finite times required for the transmission of signal information over the relatively large distances involved. This delay cannot be avoided and is not objectionable so long as the system introduces the same delay for all frequency components falling within the band of frequencies to be transmitted. Under these conditions the slope of the phase versus frequency characteristic is constant. Most of these systems however do have a measureable variation across the transmission band in the phase delay or shift with respect to frequency, resulting in envelope delay distortion as defined above. As pointed out in an article entitled "The Measurement of Delay Distortion in Microwave Repeaters" by D. H. Ring, published in the Bell System Technical Journal for April 1948 beginning at page 247, envelope delay may be measured by determining the change in phase of the transmitted wave which occurs as the carrier frequency changes over a particular frequency interval. This quantity which is the slope of the phase versus frequency curve of the transmission system for the chosen interval is, as pointed out above, a constant only in an ideal system. In a system subject to envelope delay distortion the slopes found by measurement over different elemental frequency intervals will differ at different points in the band of frequencies to be transmitted and the way in which these slopes vary is determinative of the envelope delay distortion of the system.

Methods have long been known for the measurement of the envelope delay distortion characteristic of transmission systems on a point-by-point basis as disclosed for example in "Measurement of Phase Distortion" by H. Nyquist and S. Brand, Bell System Technical Journal, July 1930, pages 526 and 527. Further, various types of equipment have been developed for automatically measuring the delay distortion for all frequencies within a given band. All of these methods and equipments however have required the transmission of a reference quantity with respect to which the phase delay can be determined. In certain apparatus for this general purpose a test signal is sent over the system under test and returned over a second system to the initiating station at which a comparison of the relative phase may be accomplished. In other test equipment a reference wave is sent over a parallel system which introduces a known delay and serves as a basis for comparison. In still other apparatus for this purpose the reference signal is sent over the system under investigation along with a test signal and separated therefrom at the receiving station by relatively complicated techniques which involve the use of additional equipment.

Objects of the present invention are to provide equipment for measuring envelope delay distortion on a so-called straight-away basis which shall eliminate the necessity for the transmission of a reference signal and to reduce the cost and complexity of test equipment for this purpose.

In accordance with the invention there is provided apparatus for producing a test signal comprising a carrier which is frequency modulated by a linear saw-tooth wave to sweep the carrier frequency over the band for which delay distortion information is required and further circuits for modulating this carrier either as to amplitude or frequency by a single tone. This test signal is transmitted over the system to be investigated and is detected at the receiver, the type of detector employed depending upon the type of modulation introduced in the test signal. Circuits are provided for recovering both the saw-tooth component, which serves as a sweep signal proportional to frequency for an indicating oscilloscope, and the single tone component. The latter component is applied to two paths one of which includes a delay line. Comparison of the output from the two paths after attenuation to equalize the output amplitudes of the two paths results in a quantity which is a measure of the slope of relative phase delay as a function of frequency for the frequency interval set by the delay line. This quantity is integrated over the frequency range under investigation to obtain the delay distortion characteristic which may be directly presented on the oscilloscope.

The above and other features of the invention will be described in detail in the following specification taken in connection with the drawing in which:

Fig. 1 is a schematic diagram in block form of apparatus according to the invention for the straight-away measurement of envelope delay distortion; and Fig. 2 is a block diagram of elements to be substituted between the points *x*, *y*, *z* of Fig. 1 to modify the equipment disclosed for use with amplitude modulated systems.

One embodiment of the invention as arranged for use in determining the envelope delay distortion characteristic of frequency modulation systems will be described with reference to Fig. 1 of the drawings. Here the system under investigation which may be a coaxial cable system, radio relay, or similar system is indicated by the dashed block 10. Apparatus for producing the test signal applied according to the invention appears to the left of system 10 in Fig. 1 and is located at the transmitting terminal of the system. The remaining apparatus appearing at the right of system 10 is located at the receiving terminal of the system and is employed according to the invention to produce directly a visible indication of the delay distortion characteristic of the system.

Basically the apparatus for producing the test signal includes means for modulating by a single frequency tone a carrier the frequency of which is itself swept linearly across the band of frequencies for which the characteristics of transmission system 10 are to be investigated. In other words, the test signal comprises a carrier that is frequency modulated by a saw-tooth wave and either frequency or amplitude modulated by a single frequency wave. While such a test signal may be produced in a variety of ways it is convenient as shown in Fig. 1 to produce the two modulations separately. Thus a conventional oscillator 12 is employed to produce a carrier the nominal frequency of which is related to and is preferably several times the midband frequency of the system under test. The operating frequency of oscillator 12 is swept across a frequency band equal in width to the band of the system under test by a saw-tooth wave of repetition rate $f$. This saw-tooth wave may be produced by a conventional linear saw-tooth wave generator 14 and may control the frequency of oscillator 12 through a reactance modulator 16 of a well-known type. Such saw-tooth modulation of the carrier sweeps the frequency thereof between limits which may be identified as $F_1$ and $F_2$ and this frequency modulated carrier is applied to a mixer 18.

Also applied to mixer 18 is the output of a second oscillator 20, the nominal frequency ($F_3$) of which is equal to the mean frequency of oscillator 12 less the midband frequency of transmission system 10. This oscillator is modulated preferably at a low deviation ratio by a single tone obtained from an oscillator 22 shown in Fig. 1 as having an operating frequency of 200 kilocycles per second.

Although either amplitude or frequency modulation may be employed for the application of the single frequency tone to oscillator 20 it is convenient as assumed in Fig. 1 to employ frequency modulation of oscillator 20 if the system 10 under test is a frequency modulation system since the limiting circuits normally found in such systems would suppress or eliminate entirely any amplitude modulation occurring in the test signal. In this instance the modulator 24 shown connected between single tone generator 22 and oscillator 20 may be a reactance modulator identical to modulator 16.

The modulated output of oscillator 20, comprising a carrier $F_3$ frequency modulated by the single tone output of oscillator 22, combines in mixer 18 with the frequency swept output of oscillator 12 to provide a test signal comprising a carrier normally falling at the midband of the system to be tested and swept linearly across that band, this carrier at the same time being modulated by a single frequency tone.

It will be understood, of course, that the mixer 18 may be arranged to produce an output corresponding to the sum rather than the difference of the frequencies of the applied waves. In such case the frequencies specified for oscillators 12 and 20 must be correspondingly changed to provide a test signal with the required center frequency.

After transmission through the system under investigation the test signal is applied to a conventional frequency modulation detector or discriminator 26 at the output of which are available both the single frequency tone and the saw-tooth wave employed for sweeping the frequency of oscillator 12. These outputs are separated by filters, a low-pass filter 28 being employed to select the saw-tooth wave for application through an amplifier 30 to the horizontal deflection plates of a cathode ray oscilloscope 32. The use of the recovered saw-tooth wave as a sweep insures a linear frequency scale and also automatically compensates for any fixed time delay between the sending and receiving ends of the circuit under test.

The other output of the detector comprising the recovered single frequency tone is selected by a band-pass filter 34 and applied to two separate paths. The first of these paths includes a phase shifter 36 and a delay network 38 while the second includes an attenuator 40 and one pair of contacts of a double-throw solenoid operated switch 42. It will be understood that as the frequency of the test signal carrier is swept across the band of the system under investigation distortion occasioned by unequal phase delays of different carrier frequency components will result in variations in the relative phase of the recovered single frequency tone. Thus if this tone is applied to the two paths referred to above the tone at the output of delay network 38 will have undergone a phase shift or delay during the interval introduced by the network which will not be experienced by the tone in the second path. The delay to be introduced by network 38 is the time required to sweep the frequency of the test signal over the chosen elementary frequency interval and depeds upon the repetition rate of the saw-tooth sweep wave and upon the frequency interval employed. As the repetition rate is increased, the delay may be reduced for measurement of phase shift over a given frequency interval. If it is desired to increase the precision of measurement by employing a smaller frequency interval, the delay must be correspondingly reduced.

A direct measure of the phase delay over the interval of the delay network may be obtained by comparison of the outputs of the two paths. Such a comparison may be made by a conventional phase sensitive detector 44. Either of the so-called phasemeter circuits disclosed in "Electron Tube Circuits" by Seely, McGraw-Hill, 1950, beginning at page 483 are satisfactory for this purpose. To facilitate such comparison, attenuator 40 is provided in the second path to compensate for any loss in the delay line thus equalizing the amplitudes of the signals at the outputs of the two paths. Further, an adjustable phase shifter 36 may be provided to introduce a fixed phase delay in the path including the delay network thereby to provide a zero point corresponding to a particular chosen frequency in the band transmitted by the system under investigation.

The output of the phase-sensitive detector is a measure of the slope of the phase characteristic for the particular frequency interval determined by the time interval set by delay network 38 and the rate of frequency sweep. In the presence of distortion this quantity will vary over different portions of the transmission band and must be integrated over the band of the system under test (this corresponds to the period of the saw-tooth wave sweep) to obtain the delay distortion characteristic. This is accomplished by an integrator 46 which may in simple form comprise a circuit including a series resistor and shunt capacitor or may comprise one of the more complicated electron tube integrating circuits known in the art. The output of integrating circuit 46 is a quantity which during the sweep of the test signal varies as the envelope delay introduced by the system under test. After amplification by an amplifier 48 this quantity is applied to the vertical deflecting plates of oscilloscope 32, the horizontal sweep of which is synchronized with the sweep of the test signal as pointed out above. There is thus obtained a visual representation of the envelope delay distortion characteristic for the system.

The indication appearing on the screen of oscilloscope 30 may be calibrated both as to frequency and as to delay by known techniques. For example, absorption type wave meters may be introduced in tandem with the transmission path of the system under investigation to produce pips during the horizontal deflection of the oscilloscope corresponding to known frequencies in the band of transmission system 10. Similarly, a fixed phase delay may be intermittently introduced in one of the two paths between filter 34 and phase detector 44 to produce a shift in the oscilloscope trace corresponding to a known delay. The extent of this shift may then be measured and the vertical scale calibrated directly in terms of delay. Apparatus for introducing such a known phase shift is shown in Fig. 1 and comprises a phase shifter 52 which may be connected in circuit through switch 42, the solenoid of which is equalized by a low frequency oscillator 50. This switch alternately connects the output of attenuator 40 directly to one of the inputs of phase sensitive detector 44 or to the same input through phase shifter 52 introducing a fixed and known phase delay.

Fig. 2 is a partial schematic diagram illustrating apparatus to be substituted in the equipment of Fig. 1 between the points $x$, $y$ and $z$ in place of frequency modulation detector 26, low-pass filter 28 and band pass filter 34. The modified circuit employs amplitude modulation of the swept carrier and normally would be employed when the transmission system under investigation is itself an amplitude modulated system. In the modified test apparatus modulator 24 is an amplitude modulator and the test signal appearing at the output of mixer 18 may be considered as an amplitude modulated carrier, the frequency of which is swept linearly across the transmission band of system 10 or alternatively as a carrier amplitude modulated by the test tone and frequency modulated by the saw-tooth sweep. Recovery of the single frequency tone and the saw-tooth sweep wave at the receiver station requires the modifications indicated in Fig. 2. Thus the output of transmission system 10 is applied to an amplitude modulation detector 54 which serves to recover the single frequency tone and the output of which is applied through a band pass filter 56 to the two paths referred to above. The output of the system under investigation is also applied to a frequency modulation detector 58 which recovers the saw-tooth wave employed to sweep the carrier frequency in the test signal. The output of frequency modulation detector 58 is applied through amplifier 30 to oscilloscope 32. The system thus modified is equivalent in all other respects to that of Fig. 1 described above and the operation thereof to obtain a direct representation of the envelope delay distortion characteristic is the same.

What is claimed is:

1. In apparatus for measuring over a given transmission band the envelope delay distortion of a transmission system, means for producing and applying to such system a test signal comprising a single carrier the frequency of which is swept across the transmission band to be observed and which is sinusoidally modulated at a chosen frequency, means for detecting the signal transmitted through said system, means for applying the detected signal corresponding to the sinusoidal modulating wave to two paths, one of which includes a delay network, means for equalizing the amplitudes of the outputs of the two paths, means for combining the two outputs to obtain a measurement of the slope of the phase delay characteristic over the interval of said delay network, and means for integrating the combined output to obtain the envelope delay distortion characteristic.

2. In apparatus for measuring over a given transmission band the envelope delay distortion of a transmission system, means for producing and applying to such system a test signal comprising a single carrier the frequency of which is swept across the transmission band to be observed and which is sinusoidally modulated at a chosen frequency, means for detecting the signal transmitted through said system, means for applying the detected signal corresponding to the sinusoidal modulating wave to two paths one of which includes a delay network, an attenuator in the other of said paths for equalizing the amplitudes of the outputs of the two paths, a phase detector for accepting the output of the two paths and producing a quantity representative of the phase difference between the signals in the two paths, and means for integrating the output of said phase detector with respect to time to obtain the envelope delay distortion characteristic.

3. In apparatus for measuring over a given transmission band the envelope delay distortion of a transmission system, means comprising a pair of modulated oscillators, means for frequency modulating one of said oscillators by a low frequency saw-tooth wave, means for modulating the other of said oscillators with a single frequency wave, and means for combining the outputs of the two oscillators to produce a test signal comprising a single carrier the frequency of which is swept across the transmission band to be observed and which is modulated by said single frequency wave; means for applying said test signal to the system to be tested, means for detecting the signal transmitted through said system, separate circuits for recovering from said detected signal the saw-tooth wave and the single frequency, means for applying the recovered single frequency wave to two paths one of which includes a delay network, means for combining the outputs of the two paths to obtain a measurement of the slope of the phase delay characteristic over the interval of said delay network, means for integrating the combined output to obtain the envelope delay distortion characteristic, and indicating means responsive to said integrated output and to said reproduced saw-tooth wave to produce a representation of the delay distortion characteristic of said transmission system.

4. In apparatus for measuring over a given transmission band the envelope delay distortion of a transmission system, means comprising a pair of modulated oscillators, means for frequency modulating one of said oscillators by a low frequency saw-tooth wave, means for modulating the other of said oscillators by a sinusoidal wave, and means for combining the outputs of the two oscillators to produce a test signal comprising a single carrier the frequency of which is swept across the transmission band to be observed and which is modulated by said sinusoidal wave; means for applying said test signal to the system to be tested, means for detecting the signal transmitted through said system, means for recovering in separate circuits and from said detected signal the saw-tooth wave and the sinusoidal wave, means for applying the recovered sinusoidal wave to two paths one of which includes a delay network, means for equalizing the amplitudes of the outputs of the two paths, means for combining the two outputs to obtain a measurement of the slope of the phase delay characteristic over the interval of said delay network, means for integrating the combined output to obtain the envelope delay distortion characteristic, a cathode ray oscilloscope having orthogonal deflection axes, means for applying said reproduced saw-tooth wave to sweep the electron beam of said oscilloscope along one deflection axis and means for applying said integrated output to sweep the said electron beam along the other deflection axis.

5. In apparatus for measuring over a given transmission band the envelope delay distortion of a transmission system, means for producing and applying to such system a test signal comprising a single carrier the frequency of which is swept across the transmission band to be observed and which is sinusoidally modulated at a chosen frequency, means for detecting the signal transmitted through said system, means for applying the detected signal corresponding to the sinusoidal modulating wave to two paths, one of which includes a delay network, means for equalizing the amplitudes of the outputs from the two paths, means for combining the two outputs to obtain a measurement of the slope of the phase delay characteristic over the interval of said delay network, means for integrating the combined output to obtain the envelope delay distortion characteristic, a cathode ray oscilloscope responsive to said integrated output to produce a trace representing the envelope delay distortion characteristic and calibrating means for said oscilloscope including apparatus for intermittently introducing an additional phase delay in the other of said paths.

6. In apparatus for measuring over a given transmission band the envelope delay distortion of a transmission system, means comprising an oscillator, means for producing a linear saw-tooth wave of relatively low frequency, means for frequency modulating said oscillator by said saw-tooth wave, a second oscillator having a frequency different from the mean frequency of said first oscillator by an amount determined by the center frequency of the passband of said transmission system, means for producing a sinusoidal wave of predetermined frequency, means for modulating said second oscillator by said sinusoidal wave, and means for combining the outputs of said oscillators to produce a test signal comprising a single carrier the frequency of which is swept across the transmission band to be observed and which is modulated by said sinusoidal wave; means for applying said test signal to said system, means for detecting the signal transmitted through said system, means for applying the output of said detecting means to a pair of filter elements one of which accepts frequency components corresponding to said sinusoidal wave and the other of which accepts only those frequency components corresponding to said saw-tooth wave, means for applying the output of said first filter to two paths, one of which includes a delay network, means for equalizing the amplitude of the outputs of said two paths, means for combining said outputs, means for integrating the combined output to obtain the envelope delay distortion characteristic, a cathode ray oscilloscope having two sets of deflecting circuits, means for applying the integrated output to one of said sets of deflecting circuits, and means for applying the output of said second filter to the other of said deflecting circuits.

7. In apparatus for measuring over a given transmission band the envelope delay distortion of a transmission system, means comprising a first oscillator, means for producing a linear saw-tooth wave, means for frequency modulating said oscillator by said saw-tooth wave, a second oscillator having a mean frequency differing from the mean frequency of said first oscillator by the center frequency of the passband of the transmission system, means for amplitude modulating said second oscillator by a sinusoidal wave of predetermined frequency, and means for combining the outputs of said two oscillators to produce a test signal comprising a single carrier the frequency of which is swept across the transmission band to be observed and which is modulated by said sinusoidal wave; means for applying said test signal to the system to be tested, an amplitude modulation detector at the output of said transmission system, means for applying the detected signal corresponding to the sinusoidal modulating wave to two paths one of which includes a delay network, means for equalizing the amplitudes of the outputs of the two paths, means for combining the two outputs to obtain a measurement of the slope of the phase delay characteristic over the interval of said delay network, means for integrating the combined output to obtain the envelope delay distortion, a frequency modulation detector also connected to the output of said transmission system, a cathode ray oscilloscope having two pairs of deflecting circuits, means for applying said integrated output to one of said pair of deflecting circuits, and means for applying the output of said frequency modulation detector to the other said pair of deflecting circuits.

References Cited in the file of this patent

UNITED STATES PATENTS

| | | |
|---|---|---|
| 1,831,881 | Potter | Nov. 17, 1931 |
| 2,588,376 | Fox | Mar. 11, 1952 |
| 2,617,855 | Etheridge, Jr. | Nov. 11, 1952 |
| 2,625,614 | Schelleng | Jan. 13, 1953 |
| 2,632,792 | Selz | Mar. 24, 1953 |

OTHER REFERENCES

"An Envelope Delay Scanner," By Hunt and Albersheim Bell Telephone System Monograph 1967, published in Proc. of the I. R. E., vol. 40, pages 454–459, April, 1952.